E. W. BURGESS.
HAY RAKE.
APPLICATION FILED DEC. 9, 1915.
1,272,617.
Patented July 16, 1918.
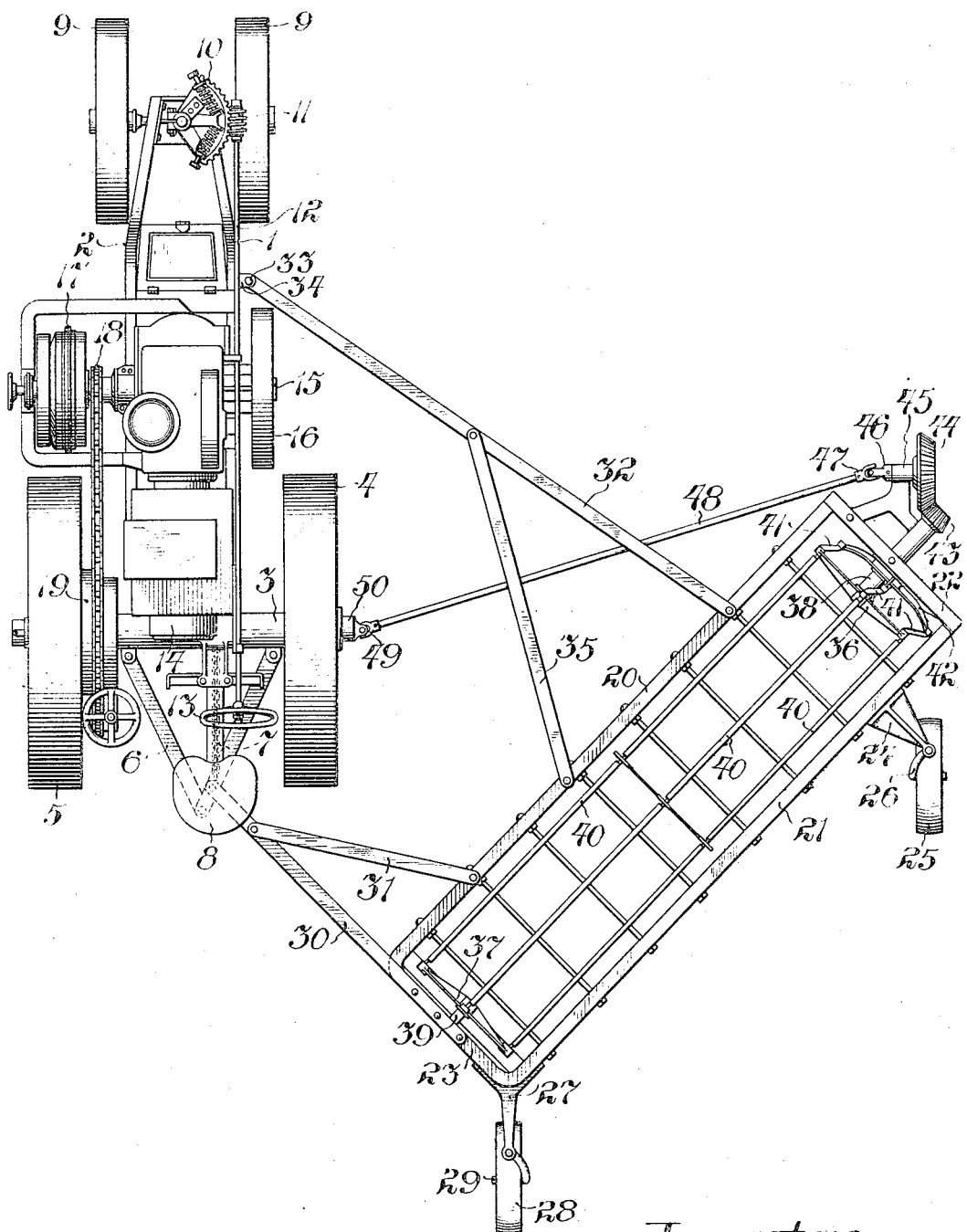
Inventor.
Edward W. Burgess
By Chas. E. Lord
Atty.

UNITED STATES PATENT OFFICE.

EDWARD W. BURGESS, OF CHICAGO, ILLINOIS, ASSIGNOR TO INTERNATIONAL HARVESTER COMPANY OF NEW JERSEY, A CORPORATION OF NEW JERSEY.

HAY-RAKE.

1,272,617.

Specification of Letters Patent.

Patented July 16, 1918.

Application filed December 9, 1915. Serial No. 66,004.

*To all whom it may concern:*

Be it known that I, EDWARD W. BURGESS, a citizen of the United States, residing at Chicago, in the county of Cook and State of Illinois, have invented certain new and useful Improvements in Hay-Rakes, of which the following is a full, clear, and exact specification.

My invention relates to hay rakes of the side delivery type, and comprises means whereby the draft frame of the rake may be detachably connected with the draft frame and truck frame of a tractor in a manner to draw the rake in trailing and offset relation and permit it to deliver a windrow in rear of the tractor, and means whereby the operative elements of the rake are driven from the traction wheels of the tractor.

The object of the invention is to improve and simplify a construction of tractor operated rake that may be quickly coupled with or uncoupled from a tractor, to eliminate tractive power elements from the machine, and to enable it to deliver a windrow within the path of a trailing wagon and hay loader that may be drawn by the tractor.

These and other objects are attained by means of the mechanism illustrated in the accompanying drawing, in which the same reference numerals designate like parts.

1 and 2 represent right and left-hand longitudinally disposed truck frame members of a tractor, respectively, having their rear ends supported by an axle carrying member 3, having right and left-hand traction wheels 4 and 5, respectively, mounted at its opposite ends, 6 a V-shaped draft frame connected with the member 3 and supported by means of a suitably supported chain 7, and 8 represents an operator's seat carried by the member 3. The front end of the truck frame is carried by steering wheels 9 in a common way. The steering mechanism includes a toothed sector 10, a worm 11 engaging with the sector and secured to the front end of a shaft 12, having a hand wheel 13 secured to its rear end convenient to an operator in the seat 8.

The engine includes a power cylinder 14, a power shaft 15, fly wheel 16, a transmission gear mechanism 17 including a sprocket chain 18 connecting it with a differential gear mechanism 19 carried by the axle and transmitting power to the traction wheels in a common way.

The rake includes a rectangular frame having front and rear side members 20 and 21, respectively, disposed at an angle with the line of draft, and front and rear end members 22 and 23, respectively. 24 represents a bracket member secured to the member 21 near its front end, and 25 a caster wheel journaled upon an arm 26 journaled in the bracket, 27 a bracket secured to the rear corner of the frame, and 28 a caster wheel journaled upon an arm 29 journaled in the bracket 27, 30 a draft frame member having its rear end secured to the rear end of the member 23 and its front end detachably connected with the draft frame 6, and 31 a diagonally disposed brace member connecting the front end of the member 30 with the frame member 20, 32 a draft frame member having its rear end secured to the member 20 and its front end detachably connected with the truck frame member 1 by means of a pin 33 coupling it with an eye member 34 secured to the member 1 near its front end, and 35 represents a diagonally disposed brace member having its front end secured to the middle of the member 32 and its rear end to the member 20.

The raking cylinder mechanism includes front and rear spider members 36 and 37 that are journaled in bearing members 38 and 39 carried by the front and rear end frame members 22 and 23, respectively. 40 represents the usual rocking tooth carrying bars journaled in the arms of the spider and controlled by means of crank arms 41 connecting them with the arms of a spider 42 rotatably mounted upon the frame eccentric to the axis of the raking cylinder in a common way.

Motion is transmitted from the tractor to the raking cylinder by means including a bevel pinion 43 secured to the axle of the raking cylinder and meshing with a driving gear 44 secured to one end of a transversely disposed shaft journaled in a bearing member 45 preferably integral with the bearing member 38, and 46 represents a universal coupling member secured to the opposite end of the shaft whereby it is operatively connected with a corresponding coupling member 47 secured to the front end of a rearwardly inclined shaft 48 that is provided with a universal coupling member 49 whereby it is operatively connected with a sleeve member 50 rotatable with the traction wheels of the tractor. When the tractor advances motion is transmitted to the raking cylinder and the hay is moved laterally and rearwardly, forming a windrow in rear of the tractor.

Having shown and described one embodiment of my invention, I do not desire that it be confined to the specific details of the structure as illustrated, it being understood that changes may be made in the form and organization of the various parts without departing from the spirit of the invention as indicated in the appended claims.

What I claim as my invention, and desire to secure by Letters Patent, is:

1. In combination, a rake frame, a rotatable hay raking element carried by said frame, a motor-operated vehicle having power driven traction wheels thereon, means for detachably connecting said frame with said vehicle, and means operatively connecting said hay raking element with one of the power driven traction wheels for giving the raking element a raking action.

2. In combination, a rake frame, a rotatable hay raking element carried by said frame, a motor operated vehicle having power driven traction wheels thereon, means for detachably connecting said frame with said motor-operated vehicle in trailing and offset relation, and including a plurality of braces connected to said vehicle in spaced relation, means for operatively connecting said hay raking element with one of the power driven wheels of said vehicle for actuating said raking elements.

3. In combination, a rake frame disposed at an angle with the line of draft, a draft frame forming a part of said rake frame, a rotatable hay raking cylinder journaled in bearings carried by said rake frame, a motor-operated vehicle having power driven traction wheels and disposed in advance of and at one side of said rake frame, means including a plurality of braces for detachably connecting said draft frame with said vehicle, and flexible operating connections between said cylinder and one of the power driven traction wheels of said vehicle for actuating the said raking cylinder.

4. In combination, a rake frame disposed at an angle with the line of draft, supporting means for the rear end of said frame, a rotatable raking cylinder journaled on said frame, a motor-operated vehicle disposed in advance of and at one side of said frame, and diagonally disposed braces secured at their rear ends to the front of said rake frame and projecting forwardly and laterally therefrom and secured at their front ends to the frame of said motor-operated vehicle at points disposed substantially at the front and rear of said frame.

In testimony whereof I affix my signature.

EDWARD W. BURGESS.